Oct. 22, 1929.  L. E. TOPHAM  1,732,345
REVERSE REPRODUCTION FROM MODELS
Filed March 12, 1928  2 Sheets-Sheet 1
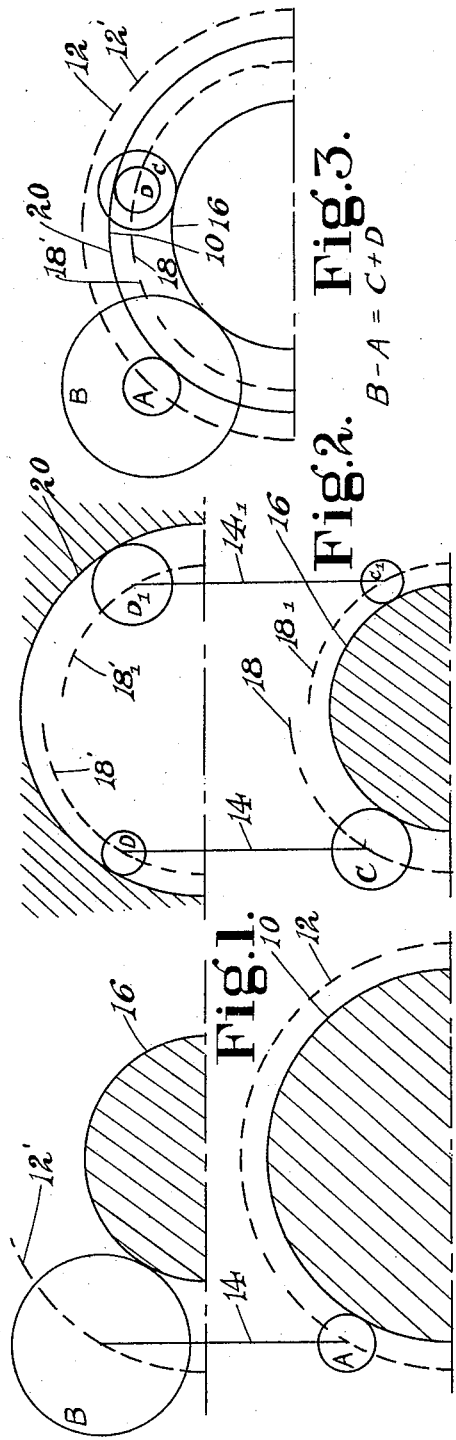
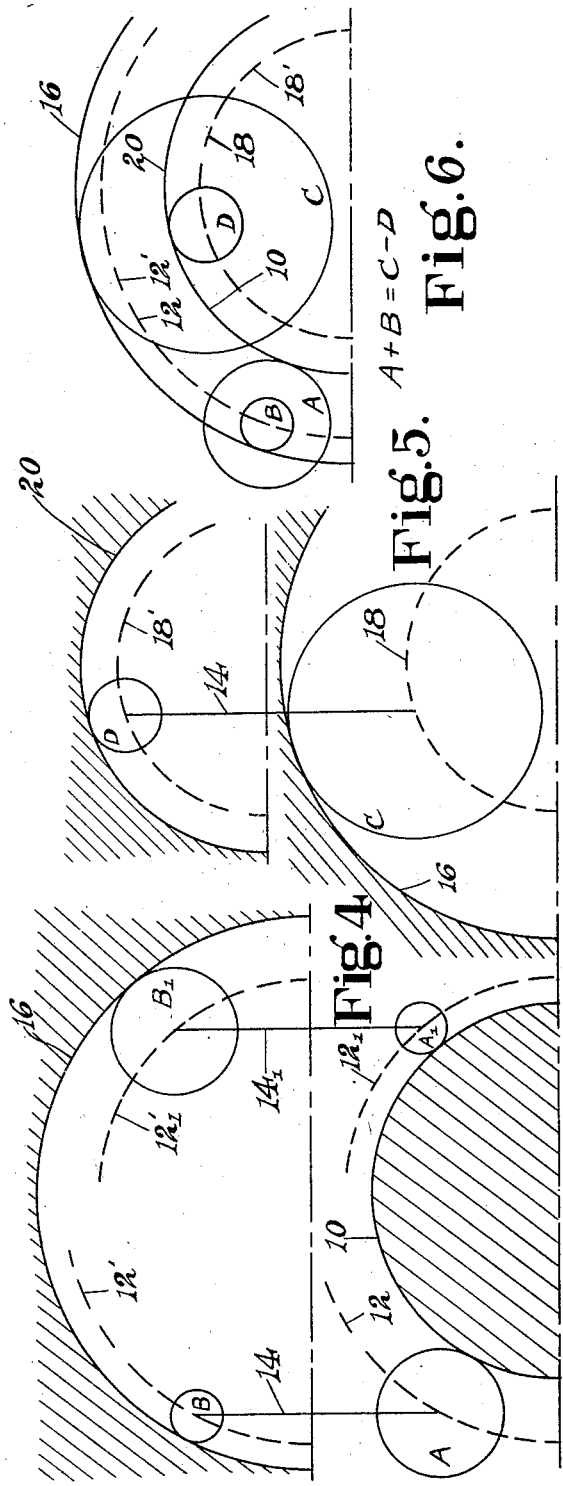
INVENTOR- Laurence E. Topham.

Oct. 22, 1929.   L. E. TOPHAM   1,732,345
REVERSE REPRODUCTION FROM MODELS
Filed March 12, 1928   2 Sheets-Sheet 2
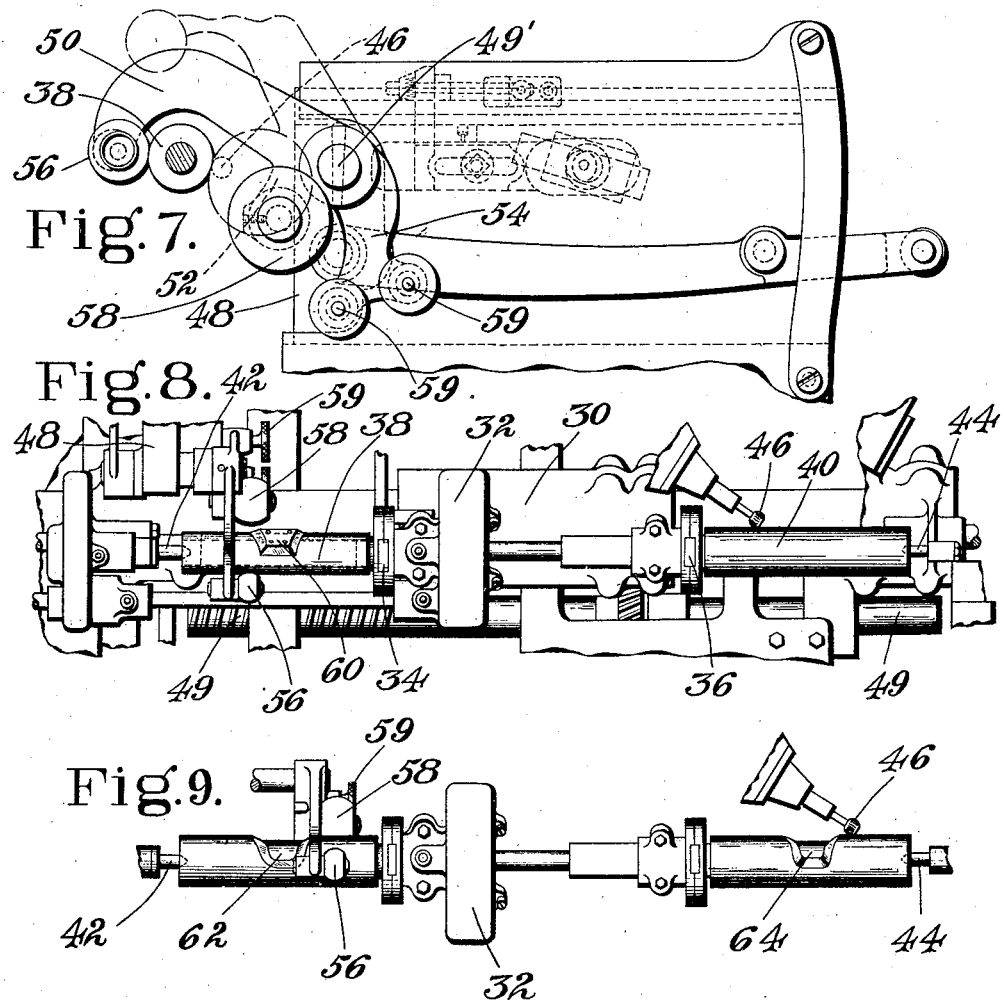
INVENTOR-
Laurence E. Topham Patented Oct. 22, 1929

1,732,345

UNITED STATES PATENT OFFICE

LAURENCE E. TOPHAM, OF WENHAM, MASSACHUSETTS, ASSIGNOR TO UNITED SHOE MACHINERY CORPORATION, OF PATERSON, NEW JERSEY, A CORPORATION OF NEW JERSEY

REVERSE REPRODUCTION FROM MODELS

Application filed March 12, 1928. Serial No. 261,090.

This invention relates to methods of and machines for the reverse reproduction of objects from a model, that is, of female matrices from a solid or male pattern, or vice versa, for example, an object of the invention being to make a female or male matrix or other object everywhere of exactly numerically equal but reverse curvature to that of a model, from which objects exactly like the model can be molded or otherwise produced.

Heretofore such reverse reproduction has been effected by direct molding and casting, which involves certain gross inaccuracies due to shrinkage. It has been impossible to cut such reversely curved objects accurately from models in copying machines. A copying machine or lathe consists fundamentally of a leader for traversing the surface of a model, and a tool for traversing the surface of the work, the movement of the tool relatively to the work being controlled by the contact of the leader and model. As a practical matter, the tool and model wheel must be of finite size, and in general, of substantial size, and their form, as another practical matter, must be effectively circular. In a machine organization such as that just referred to the centers of the leader and tool are compelled to move in similar or equal paths, but since they are not geometrical points the shapes of the model and work piece will not have the same shape and size except in 1:1 reproduction, that is, in exact copying as to degree and kind of curvature. Thus, in reverse reproduction, owing to the necessary finite size of the leader and the tool in such machines, the work, though reversely curved, will not have the same numerical curvature (or sharpness of curvature) as the model. The curvature of the female piece will always be flatter than that of the male piece. Accurate reproduction with reversal of curvature or, in other words, the reproduction of curvature numerically equal but of opposite kind to that of the model is impossible with these machines.

This can be more readily understood by imagining a sphere rolling around the model, here assumed as convex, the model being surrounded by work material which the sphere can cut, though it is conceived as unable to cut the model. The hemisphere next the model can be regarded as a leader, and the opposite hemisphere can be regarded as a tool. The sphere is thus a combined leader and tool and will cut out (between the surface of the model and the surface produced in the work) a layer of work material of a thickness equal to its diameter. The surface of the work will enclose that of the model and will be of reverse curvature. All copying machines work on essentially this principle.

The difficulty dealt with by the present invention arises from the fact that, in cutting a work piece with reversed curvature, the leader and tool operate in effect between the surfaces of the model and work, and their radii and together and effect a difference in curvature, whereas in direct 1:1 reproduction they are outside both surfaces and their radii tend to cancel out and, if equal, do cancel out and the same curvature is produced. The numerical difference in curvature characteristic of the production of reversed curvature, and which we may call the "error" can be varied at will by a proper relation between the leader and tool as will be seen, but, as a practical matter, it cannot be reduced below a substantial value since the radius of the sphere above discussed cannot be reduced beyond a certain limit.

Objects of the present invention are to provide a method and apparatus by the use of which the above-described difficulties can be avoided.

To this end I propose to cut, from the original model, an intermediate model and to cut from this intermediate model a work piece, reversing in one of these operations the curvature of the model used in that operation. I have found that the difference in curvature unavoidably produced in the operation in which the curvature is reversed can be exactly balanced by an equal difference in curvature intentionally introduced in the other operation, in which the curvature is directly reproduced. From a consideration of the illustration used above it will be readily seen that if the leader and tool are of different effective radii, an error will arise even in direct reproduction, but accuracy can be secured by making their radii alike, as is ordinarily feasible. The present invention proposes deliberately to introduce such an error into the direct reproducing operation in order to cancel the error unavoidably produced in the reverse reproducing operation. Thus instead of sacrificing practical considerations to production of a minimum but even then prejudicial error in one operation, I secure all desired practical advantages inherent in tools of practical size, let the errors be what they may, and secure rigorous accuracy by means of two operations. Numerical differences in curvature are equalized by properly relating the radii of the leaders and the tools in the two reproducing operations, as will be explained.

The invention also includes a novel mechanism by which the method of this invention may be practised. In this aspect of the invention, a principal feature comprises a member carrying two leaders arranged to co-operate selectively with a model on opposite sides thereof, the member referred to being movable to bring either leader at will into operative relation to the model. This enables the machine to cut work with direct or reversed curvature as compared with the model, as will be seen. Thus the same machine can be used to perform both of the operations described above.

The invention will be understood from the following description taken in connection with the accompanying diagrams and machine drawings, in which Fig. 1 represents, diagrammatically, the generation of an intermediate model of direct curvature;

Fig. 2 represents the generation of a reversely curved work piece from the model generated in Fig. 1;

Fig. 3 is a combination of Figs. 1 and 2;

Fig. 4 represents the generation of an intermediate model of reverse curvature;

Fig. 5 represents the generation of a reversely curved work piece from the model generated in Fig. 4;

Fig. 6 is a combination of Figs. 4 and 5;

Fig. 7 is a detail of a part of a machine embodying the invention in its machine aspect and adapted for use in practising the method of the invention;

Fig. 8 illustrates the formation of the intermediate model by the use of this machine; and Fig. 9 illustrates the formation of the desired matrix from the intermediate model in this machine.

In Fig. 1 the curved model, which will herein be spoken of as "directly" curved, is shown at 10. This is utilized as a model in a copying machine which may be of the type set forth in my application Serial No. 530,214, filed Jan. 18, 1922, parts of such a machine being illustrated in Figs. 7 to 9. The center of a leader wheel A moves around the model in the curve 12 which causes the center of a tool B, represented in effective contour by a circle, to move in an equal curve 12' by virtue of the reproducing machine structure 14 connecting them, which, for present purposes can be regarded as an inextensible rod which can move freely in a plane, remaining, however, always parallel to itself. The leader A is of smaller radius than the tool B, so that the piece 16 produced by the tool is smaller than the original model 10 and is of direct curvature. The piece 16 is an intermediate model from which a work piece is cut, as will be explained.

Consider now Fig. 2, which illustrates the second operation. The intermediate model 16 is now put into a copying machine (which may be the same machine or another) as a model, and traversed by a leader wheel C, whose center moves on a curve 18. The center of a tool D, similarly shown as a circle in effective contour, is caused to move over an equal curve 18', by the machine structure as above suggested, and the tool D cuts a reversely curved work piece 20 in the ordinary way.

If now we let A, B, C, D represent numerically the effective radii of the leaders and tools to which these letters have been already related, it is clear that in order to effect exact numerical correspondence between the opposite curvatures of the model 10 and the work 20, we must have $$B - A = C + D$$

or in other words, the overplus of the tool radius relative to the leader radius in the generation of the intermediate model must be equal to the sum of the leader and tool radii in the generation of the work from the intermediate model. As far as C and D are concerned, either of them can be taken arbitrarily here. It is only necessary that their sum be equal to $B - A$, and it is of course necessary that B be greater than A. An alternative arrangement is illustrated by subscript numerals in Fig. 2.

This will perhaps appear more simply from the illustration in Fig. 3 in which Figs. 1 and 2 are combined, the original model 10, the intermediate model 16 and the work 20 all being superposed and the model wheel and tool in each operation being superposed. It is clear from this figure that $B - A$ is the deficiency in radius of curvature of the intermediate model as compared with the original; and that $C + D$ is the surplusage in radius of curvature of the work over the intermediate model. By balancing these two I am enabled to effect reproduction with reversed curvature with exactness and yet to use tools and leaders of any convenient size.

It will be obvious that the difference between the radius of curvature of the intermediate model, and those of the original model and of the work may be taken as a measure of the differences in curvature between the intermediate model and the original model and the work respectively, though more strictly speaking, curvature, considered numerically, is the reciprocal of the radius of curvature.

Figs. 4, 5 and 6 illustrate an alternative procedure in which the intermediate model is curved reversely with respect to the first model. In this procedure the reversely curved intermediate model 16 is produced by any desired combination of leader, A and tool, B; and the same intermediate model will be produced by all arrangements where $A+B$ is constant. In the second operation the apparatus is so arranged that $A+B=C-D$. Fig. 6 makes this clear. $A+B$ is the increase in radius from the original model to the intermediate reversely curved model, and $C-D$ is the decrease in radius from the intermediate model to the work.

Figs. 1 to 6 can be regarded from a reversed point of view. In the operations above described, a convex model has been shown, and a concave work piece sought. A similar procedure will obtain a convex work piece from a concave model. Figs. 2 and 5 can be regarded as illustrating the generation of an intermediate model 16 from an original concave model 20, and Figs. 1 and 4 as illustrating the subsequent generation of a work piece 10 of reversed but numerically equal curvature. The algebraic relations between the leaders and tools are the same as before.

The illustrated machine which is adapted for practising the method above disclosed, is a modification of the last lathe shown in my application Serial No. 530,214, filed January 18, 1922, and only so much of it is herein disclosed as is necessary to an understanding of the invention.

The "swing frame" of the lathe is indicated at 30, and carries a gear box 32 from which power is transmitted to rotate model and work holding dogs 34, 36, respectively. The model is shown at 38 and the work piece at 40, supported at their outer ends on centers 42, 44.

The tool is shown at 46, and the model wheel or leader carriage at 48. In the application above referred to the leader and tool are mounted on two separate carriages for length grading purposes. Herein, the leader and cutter can be considered as mounted on the same carriage and arranged to be traversed along the model and work respectively by a screw 49. The carriage carries at 49' a pivoted three armed bell crank 50, 52, 54. The arm 50 overhangs the model 38 and carries a model wheel or leader 56; the second arm 52 carries a second model wheel 58 and the third arm 54 carries a pair of sliding pins 59 either of which can be slipped into a hole in the carriage 48 to hold the three armed bell crank in the full-line or in the dotted position shown in Fig. 7. The position of the tool is projected at 46 in Fig. 7. When the bell crank 50, 52, 54 is in full-line position (Fig. 7) the model wheel 56 is in contact with the model, and is on the opposite side of the common axis of the model and work from the tool, the model wheel 58 being swung away from the model. This will effect the production of a work piece of curvature reverse to that of the model used. When the bell crank is in dotted-line position the model wheel 58 is swung up against the model and on the same side as the tool, and the model wheel 56 is swung away from the model. This will effect the production of a work piece of direct curvature. In other words, the model wheel- or leader-carrying bell crank can be set to bring a leader into contact with the model on either side of it at will, relatively to the tool, and the machine can thus be used in direct or reverse reproduction at will.

Fig. 8 shows the machine arranged to perform the operation diagrammed in Fig. 4, that is, the cutting of an intermediate reversely curved model. It is desired to make a matrix for the object 60 which is fastened to the model holder 38. The desired matrix may be, for example, a leveling roll such as disclosed in United States Letters Patent No. 1,544,050, granted June 30, 1925, on the application of E. E. Winkley, and the object 60 a circular "development" of the sole it is desired to fit. The model wheel or leader 56 is used, which when the object 60 passes under it, will force the swing frame toward the tool and form a matrix 62 of reverse curvature in the work 40. This matrix 62 is shown in Fig. 9 mounted in the machine as model for the operation diagrammed in Fig. 5. Here the leader 58 is used, the leader 56 being turned up out of the way, and the matrix 62 is reproduced as a matrix 64. In order for this matrix 64 to fit exactly the object 60, the leaders and tools used in the two operations must have the above discussed relation $A+B=C-D$ where A and B refer to the leader and tool in the reverse cutting operation, and C and D refer to the leader and tool in the direct cutting operation.

It is often practically advisable to use the same tool in both operations. This is quite feasible. In the just described case we would then have $A+B=C-B$ or: $C-A=2B$.

In other words the direct cutting leader is larger than the reverse cutting leader and their difference in radius is twice the tool radius. They are so shown in Fig. 7. Similarly, if the procedures illustrated by Figs. 1, 2 and 3 be used, the same model wheel or leader can be used in both operations.

Having thus described my invention, what

I claim as new and desire to secure by Letters Patent of the United States is:

1. That improvement in methods of generating from an original model of direct curvature a work piece of numerically equal but reversed curvature which consists in using the original model as model in a copying machine to generate an intermediate model and then using the intermediate model in a copying machine as a model to generate a work piece having a curvature reversed relatively to that of the original model, but numerically equal thereto, the reproduction in one of the said operations being such as to reverse the curvature of the model used in that operation, and in the other operation being such as to produce a curvature which is direct as regards the curvature of the model used in the operation.

2. That improvement in methods of generating from an original model of direct curvature a work piece of numerically equal but reversed curvature which consists in generating from the original model an intermediate model of numerically different curvature and then generating from the intermediate model a work piece of curvature reversed, relatively to the original model, but numerically equal to that of the original model.

3. That improvement in methods of generating from an original model of direct curvature a work piece of numerically equal but reversed curvature which consists in generating from the original model an intermediate model of numerically different curvature and then generating from the intermediate model a work piece of reversed curvature, relatively to the original model, and differing numerically from that of the intermediate model by the same amount as that of the intermediate model differs from that of the original model.

4. That improvement in methods of generating from an original model of direct curvature a work piece of numerically equal but reversed curvature which consists in using the original model as a model in a copying machine to generate an intermediate model and then using the intermediate model in a copying machine as a model to generate a work piece, the reproduction in one of the said operations being such as to reverse the curvature of the model used in that operation, and in the other operation being such as to reproduce the kind of curvature of the model used, the leader and tool having different effective radii in that operation in which the kind of curvature of the model used is retained.

5. That improvement in methods of generating from an original model of direct curvature a work piece of numerically equal but reversed curvature which consists in using the original model as a model in a copying machine to generate an intermediate model and then using the intermediate model in a copying machine as a model to generate a work piece, the reproduction in one of the said operations being such as to reverse the curvature of the model used in that operation, and in the other operation being such as to retain the kind of curvature of the model used, the leader and tool having different radii in that operation in which the kind of curvature of the model used is retained and the leader being of greater or less radius than the tool according as the retained curvature of the model used is concave or convex.

6. That improvement in methods of generating from an original model of direct curvature a work piece of numerically equal but reversed curvature which consists in using the original model as a model in a copying machine to generate an intermediate model and then using the intermediate model in a copying machine as a model to generate a work piece, the reproduction in one of the said operations being such as to reverse the kind of curvature of the model used in that operation, and in the other operation being such as to retain the kind of curvature of the model used, the leader and tool having different radii in that operation in which the kind of curvature of the model used is retained, the leader being of greater or less radius than the tool according as the retained curvature of the model used is concave or convex, and the sum of the effective radii of the leader and tool in the operation in which the kind of curvature is reversed being equal to the positive difference of the radii of the leader and tool in the operation in which the kind of curvature of the model used is retained.

7. That improvement in methods of generating from an original model of direct curvature a work piece of numerically equal but reversed curvature which consists in using the original model as a model in a copying machine to generate an intermediate model and then using the intermediate model as a model in a copying machine to generate a work piece of curvature reverse to that of the original model, a tool of the same effective diameter being used in both operations and the difference between the radii of the leaders in the two operations being equal to the diameter of the tool.

8. In a last lathe, a swing frame comprising model and work holders, a tool and a leader carrier arranged for rectilinear traverse along a work piece and a model in the holders respectively, a member mounted on the leader carrier, and two leaders mounted on the member, the member being movable to bring the leaders selectively into operative relation to a model in the model holder on opposite sides thereof.

9. In a last lathe, a swing frame comprising model and work holders, a tool and a leader carrier arranged for rectilinear traverse along a work piece and a model in the holders respectively, a member pivoted on the leader carrier, and two leaders mounted on the member, the member being rotatable to bring the leaders selectively into operative relation to a model in the model holder on opposite sides thereof.

10. In a pattern copying machine, model and work holders, a tool and a leader carrier, a member pivoted on the leader carrier, and two leaders mounted on the member, the member being rotatable to bring the leaders selectively into operative relation to a model in the model holder on opposite sides thereof and the difference between the effective radii of the leaders being equal to the effective diameter of the tool.

11. In a pattern copying machine, model and work holders, a tool and a leader carrier, a member pivoted on the leader carrier, and two leaders mounted on the member, the member being rotatable to bring the leaders selectively into operative relation to a model in the model holder on opposite sides thereof, the leader which contacts with the model on the side corresponding to the outside of the work which contacts with the tool being of greater effective radius than the other leader.

12. In a pattern copying machine, model and work holders, a tool and a leader carrier, a member pivoted on the leader carrier, and two leaders mounted on the member, the member being rotatable to bring the leaders selectively into operative relation to a model in the model holder on opposite sides thereof, the leader which contacts with the model on the side corresponding to the outside of the work which contacts with the tool being of greater effective radius than the other leader and the difference between the effective radii of the leaders being equal to the effective diameter of the tool.

In testimony whereof I have signed my name to this specification.

LAURENCE E. TOPHAM.